Oct. 21, 1969  E. S. JONES  3,473,752
FEED MECHANISM FOR SPOOLED FILM MATERIAL
Filed Dec. 30, 1966  8 Sheets-Sheet 1

INVENTOR.
Ebert S. Jones
BY Donald Gunn

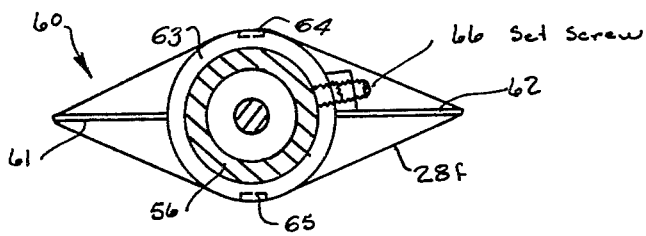
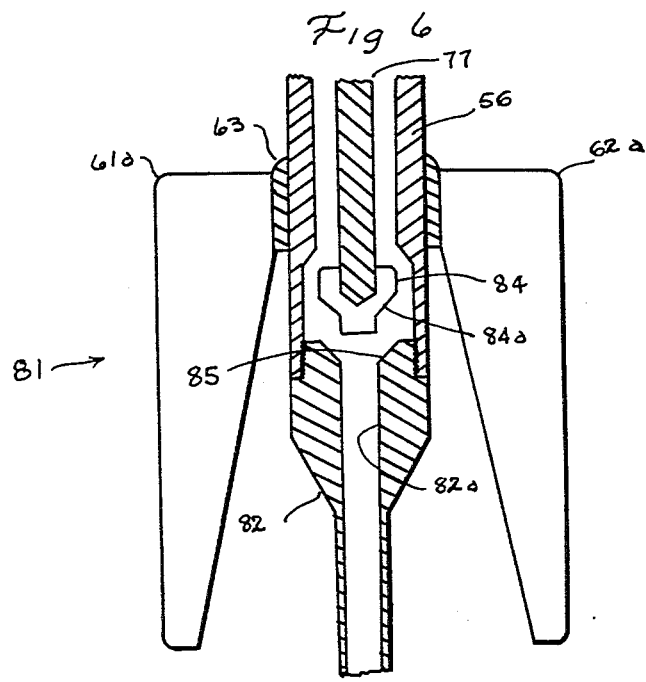
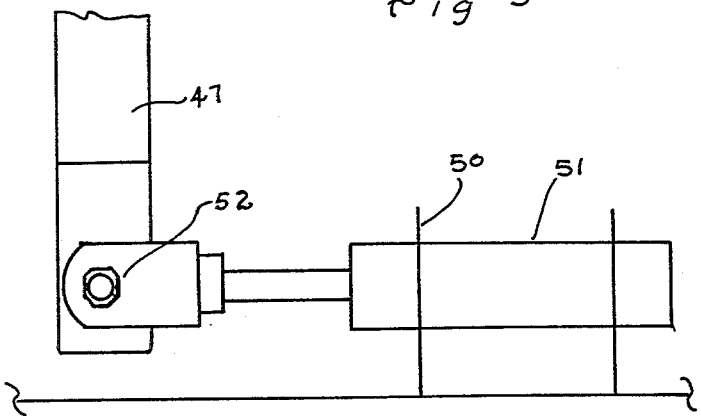

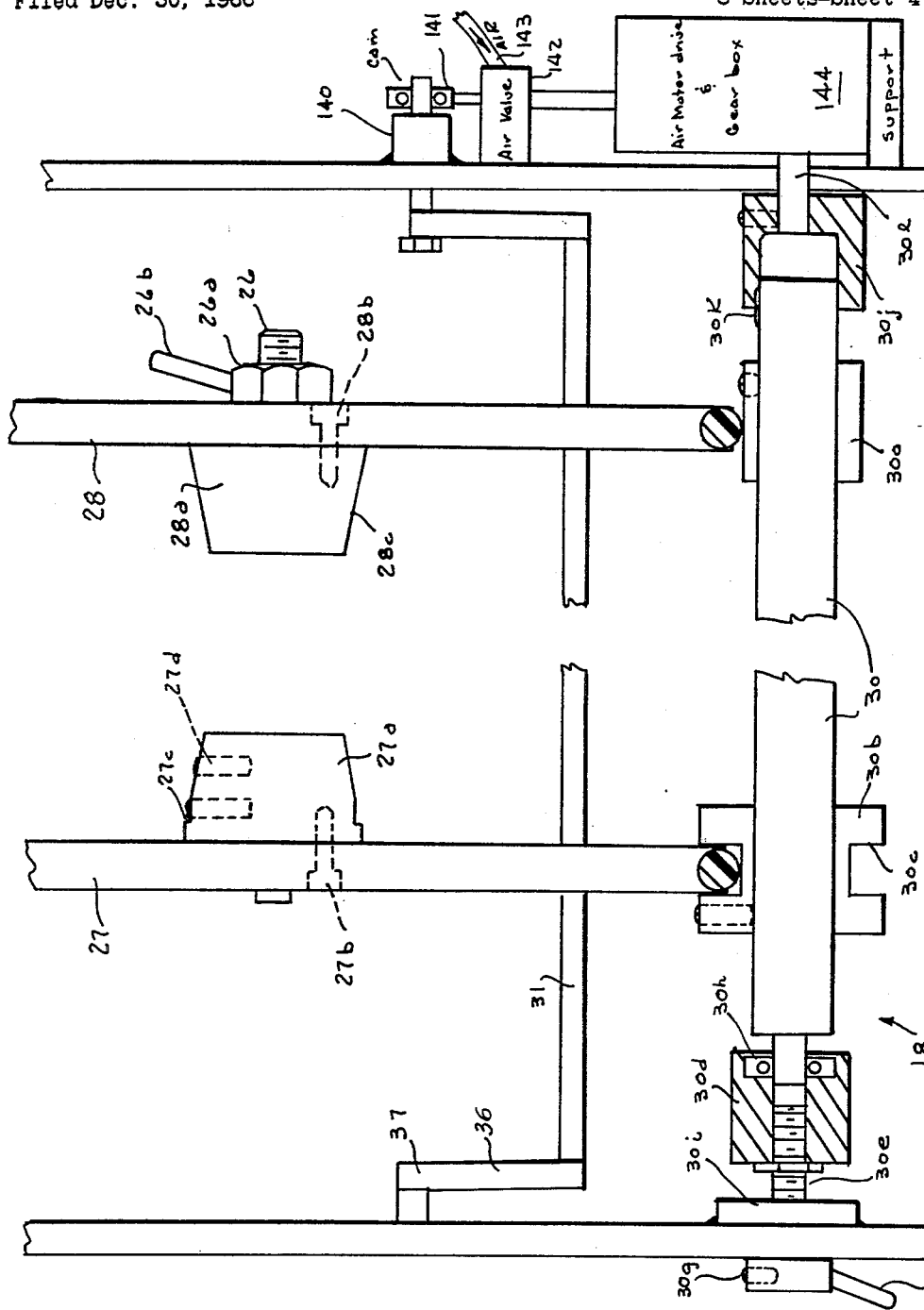

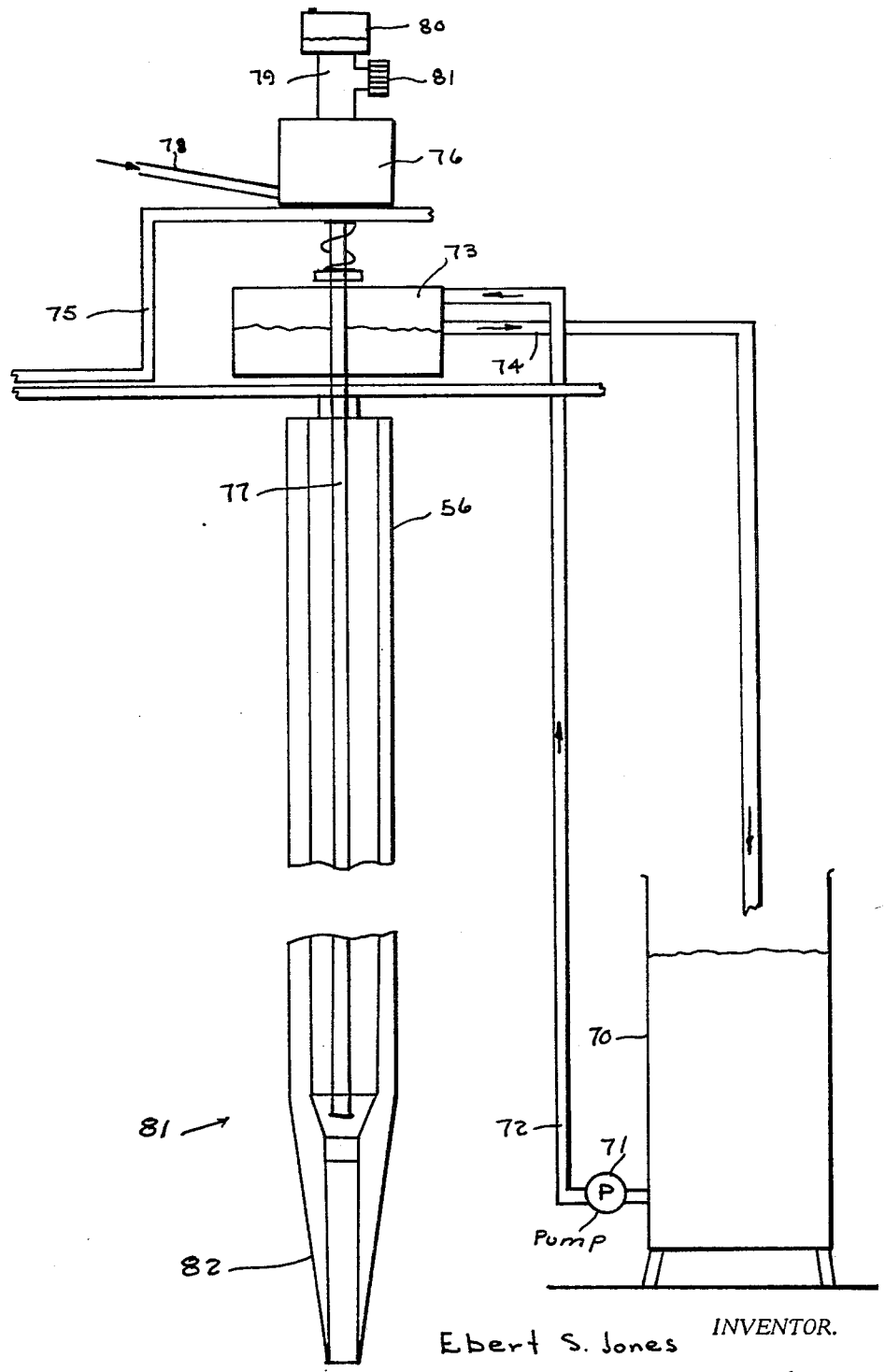

Oct. 21, 1969　　　　E. S. JONES　　　3,473,752
FEED MECHANISM FOR SPOOLED FILM MATERIAL
Filed Dec. 30, 1966　　　　　　　　　　8 Sheets-Sheet 6
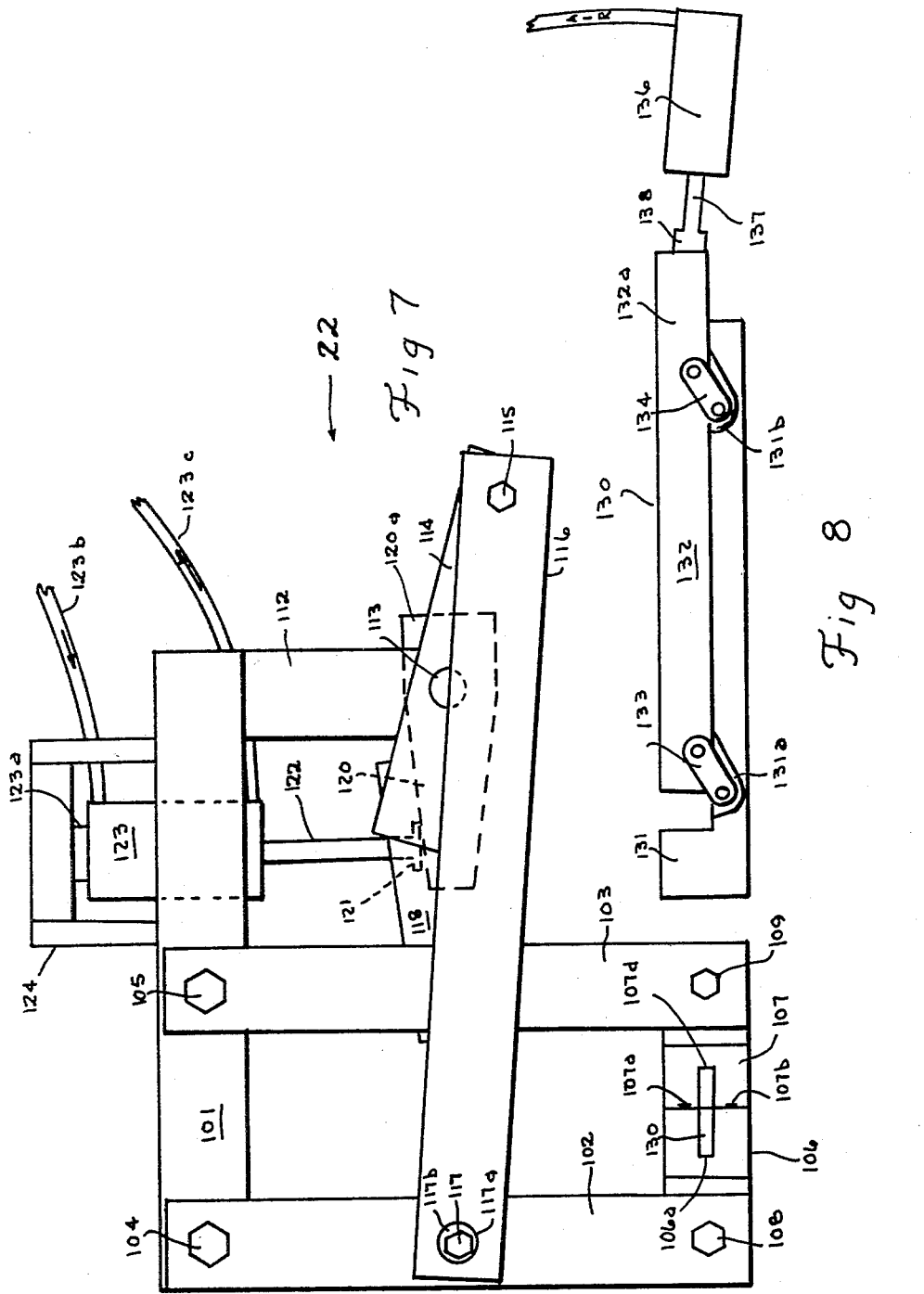
INVENTOR.
Ebert S. Jones
BY Donald Gunn

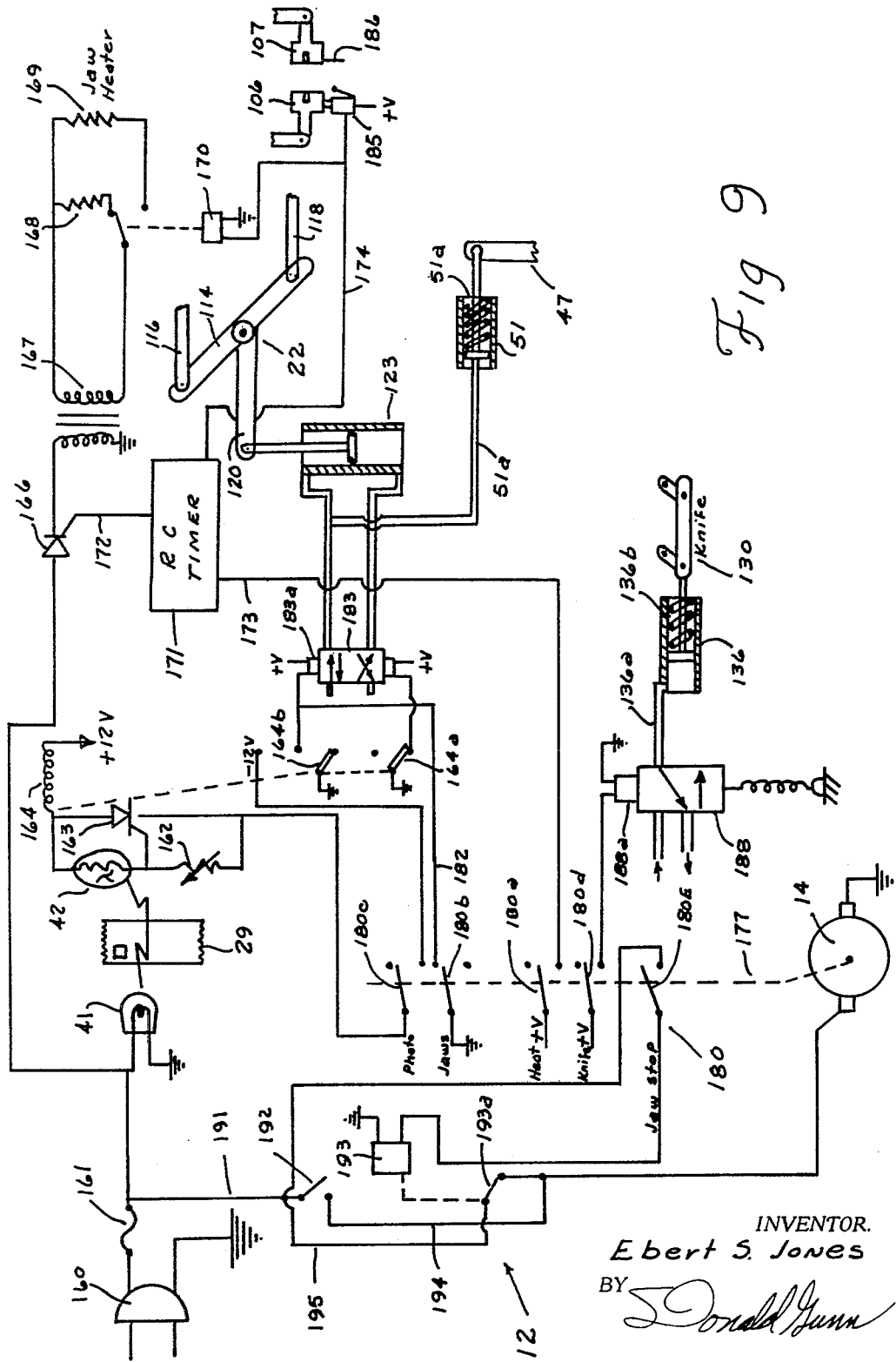

Oct. 21, 1969 E. S. JONES 3,473,752
FEED MECHANISM FOR SPOOLED FILM MATERIAL
Filed Dec. 30, 1966 8 Sheets-Sheet 8

Ebert S. Jones INVENTOR.

United States Patent Office 3,473,752
Patented Oct. 21, 1969

3,473,752
FEED MECHANISM FOR SPOOLED FILM
MATERIAL
Ebert S. Jones, 1805 Firwood, Pasadena, Tex. 77502
Filed Dec. 30, 1966, Ser. No. 612,747
Int. Cl. B65h 59/00, 17/12
U.S. Cl. 242—75.5  4 Claims

ABSTRACT OF THE DISCLOSURE

In an apparatus which uses a roll of film, a pair of hub means supporting an individual roll of film, the roll and hub means forming a removable unit which is contacted against a rotary drive mechanism, the roll of film being registered with the apparatus.

---

This invention relates to new and useful improvements in packaging machinery, and more particularly to a means forming packages from thin film material which is typically stretchy.

The sale and distribution of goods of all descriptions requires an acceptable package. Quite often, the packages must meet a number of requirements, such as the necessity of maintaining a rigid shape even when placed in packing boxes and the like. Also, packages are exposed to temperature extremes which militate against certain packing materials otherwise found desirable. Also, packages used in the distribution of food must protect the food and prevent contamination. Moreover, packaging structures should be attractive to the eye and easily merchantable. With a view of these and other problems, the packaging industry has provided several solutions which are generally expensive of nature and often lacking in some regards. By way of example, foil metals are used in packaging structures but are generally expensive. Likewise, cellophane is quite expensive also. However, one material which is not quite as expensive is film made of polyethylene. This material provides a suitable inexpensive packaging material which is difficult to handle. For instance, the material is stretchy and tends to get out of shape when handled too roughly. Further, the material is difficult to seal. It is one thing to apply heat to two pieces of polyethylene to obtain a seal therebetween in perfect laboratory conditions; it is another thing entirely to manufacture thousands of packages having a consistent leakproof seal. With a view of these problems and other problems too numerous to discuss, it is therefore one object of the present invention to provide a new and improved film handling mechanism which feeds film to a packaging machine without stretching the film.

Another object of the present invention is to provide a new and improved film spool carrier which mounts bulk film on a reel in a few seconds time without alignment problems to obtain proper registration in the machine.

An important object of the present invention is to provide a new and improved film spool carrier which drives the film reel at the periphery and only in response to tension within predetermined limits.

A timely object of the present invention is to provide a new and improved jaw arrangement for forming leakproof containers of stretchy film material wherein pressure is applied evenly along the seal.

One important object of the present invention is to provide a new and improved jaw mechanism for forming containers of film which moves both jaws toward a line of contact having a fixed location relative to the film material.

Yet another object of the present invention is to provide a new and improved jaw mechanism actuated by a single power source which avoids alignment problems whereby both jaws move in parallel motion toward one another and are not dependent on the mechanical reliability or location of packing glands or O-rings typically found in pressure operated apparatus.

An important object of the present invention is to provide a new and improved jaw mechanism having double-acting linkage means operating the jaws.

One feature of the present invention is the provision of the new and improved film containers made of stretchy material not normally admitting of a rigid or semi-rigid construction wherein the container sits erect when filled with a product.

An important object of the present invention is to provide a new and improved filling means for use in placing liquids in packages which suppresses the tendency to foam usually encountered when liquid is dumped into a container.

An important object of the present invention is to provide a new and improved packaging machine in which bulk film is rolled into a tubular shape surrounding a filler tube and individual packages are separately filled and separated from the tubular roll below the spout of the tube.

Yet another object of the present invention is to provide a new and improved liquid material filling system utilizing a filler tube in which the liquid product is constantly circulated to keep it fresh and to prevent settling or stagnation.

An important object of the present invention is to provide a new and improved packaging machine having a start-up procedure forming the containers without requiring insertion of the food to initiate the start-up. Related to this object is the fact that the present invention is improved in providing control means whereby the machine stops at the same point in each cycle.

One object of the present invention is to provide a container useful for wet or dry products, solids, powders, and the like.

Yet another object of the present invention is to provide a new and improved jaw mechanism for forming packages of film material in which the greatest force on the jaws is applied without requiring excessive operating fluid pressures in the hydraulic apparatus and wherein the greatest force is achieved when the jaws come together.

An important object of the present invention is to provide a new and improved packaging machine which forms complete packages on start-up, and more particularly, forms the vertical seam to define a tubular roll whereby short bags formed during start-up include a complete vertical seam to prevent spilling of packaged products.

An important object of the present invention is to provide a new and improved packaging machine which utilizes an extremely high percentage of a bag forming cycle to fill the container as opposed to short interval-high speed dumping of products which introduces splash back, a cloud of dust, and other product damage problems.

A related object is the provision of new and improved packaging means for liquids in a film bag whereby the top seal is completed before the air trapped in the liquid breaks to the surface in the form of foam to provide a completed container trapping the foam therein wherein the foam does not effect the heat-formed seal formed above the foam.

Other objects and advantages of the present invention will become more readily apparent from a consideration of the included specification and drawings wherein:

FIGURE 1A shows details of hydraulic apparatus of the packaging machine;

FIGURE 3 is a view of means incorporated with the packaging machine for supplying film in proper registry with the apparatus;

FIGURE 4 is a combined schematic and mechanical view of the liquid dispensing system of the present invention;

FIGURE 5 is a detailed view of a portion of the liquid dispensing apparatus shown in FIGURE 4;

FIGURE 6 is a view taken at right angles with respect to the view of FIGURE 5;

FIGURE 7 is a side view of jaws associated with the packaging apparatus for forming packages;

FIGURE 8 is a detailed view of a film cutting means incorporated in the jaws of FIGURE 7;

FIGURE 9 is a combined hydraulic and electric schematic diagram relating the steps of operation of the present invention to one another.

Figure 1:
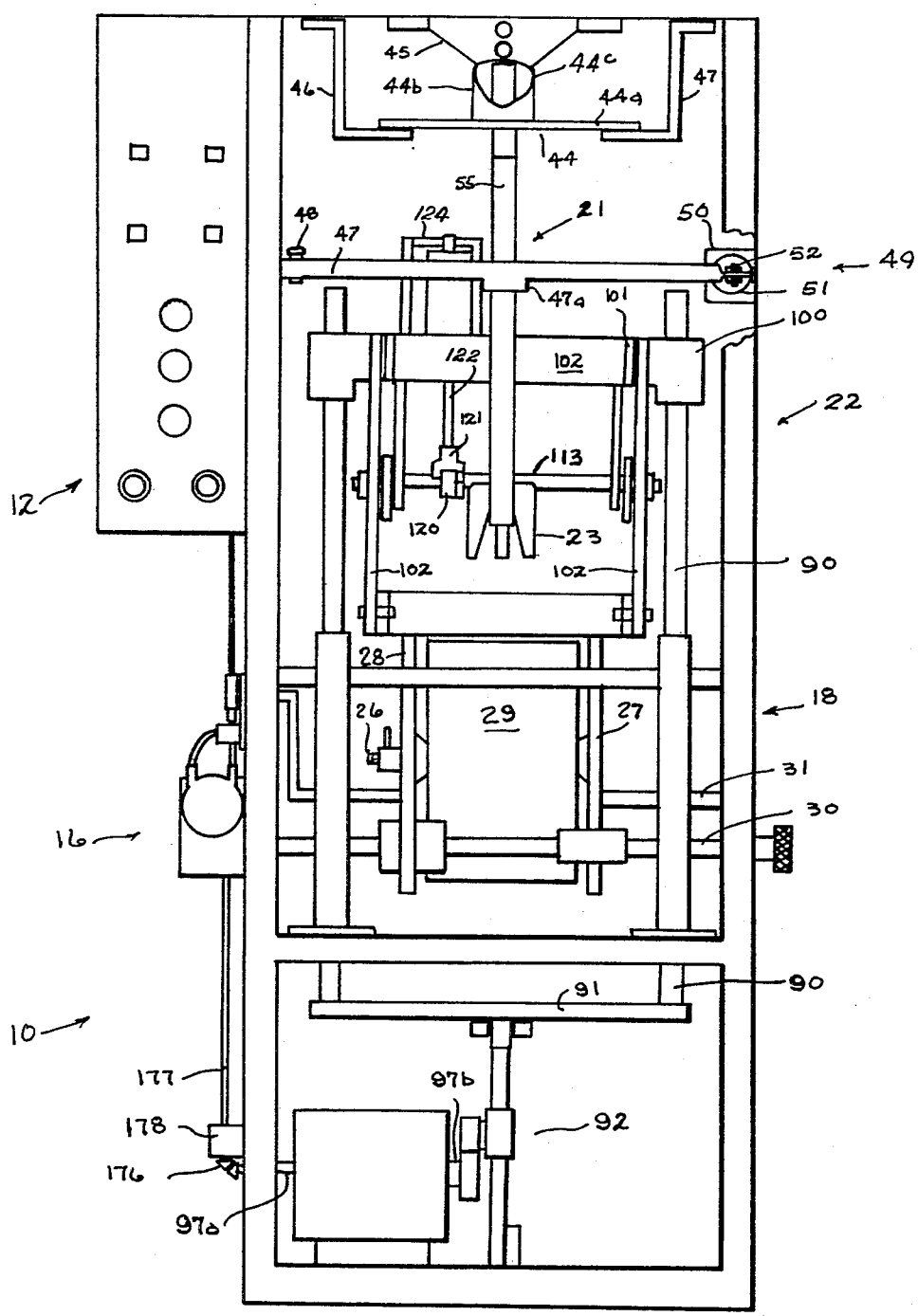
FIGURE 1 is a front view of the packaging machine of the present invention.

Attention is first directed to FIGURE 1 of the drawings which illustrates the front of the packaging apparatus of the present invention. The packaging apparatus is indicated generally by the numeral 10 and includes in the main, a control panel indicated generally at 12, a source of power 14, and the forming apparatus 16 located thereabove. Film on a spool is placed in the machine at film storage means 18 which feeds the film to the upper portions of the apparatus 10 for forming into a tubular roll member by means indicated generally at 44. The tubular roll is carried or pulled downwardly to receive a vertical seam from the means indicated generally at 21. The tubular roll of film material is pulled by the jaw means indicated generally at 22 which forms the transverse seams of the tubular member and which also cuts individual bags or sealed containers from the film roll. In addition, liquid filling means 81 fill each of the bags or containers with a selected liquid. Additional details will be noted hereinafter relating to the improvements included in the packaging apparatus 10, and attention is hereby directed to the expanded description of the present invention.

The sequence of steps in the handling of the film material will be considered, beginning with the installation of the rolled or spooled film material in the apparatus 10. The film feeding means 18 rotates on a shaft 26 connected to two hubs 27 and 28 which properly align the film 29 with the apparatus 10. The shaft 26 secures the two hubs relative to one another and does not itself impart rotation to the film spooling means 18. Rather, rotation is imparted thereto by a shaft 30 which engages each of the hubs 27 and 28. The shaft 30 carries a roller or sleeve 30a for engaging the hub 27 and also includes an additional sleeve 30b which engages the hub means 28. A groove 30c formed in the roller 30b guides and rotates the hub means 28 to maintain proper registry of the film material 29 while preventing left or right movement of the film as viewed in FIGURE 1. In addition, a cantilevered arm 31 extends across the width of the packaging apparatus 10 to receive the film material thereagainst to provide a tension takeup means which maintains a predetermined tension in the film and which also guides the film to the remainder of the packaging apparatus 10. As will be described, FIGURE 3 includes greater details concerning the film spooling means 18.

Figure 2:
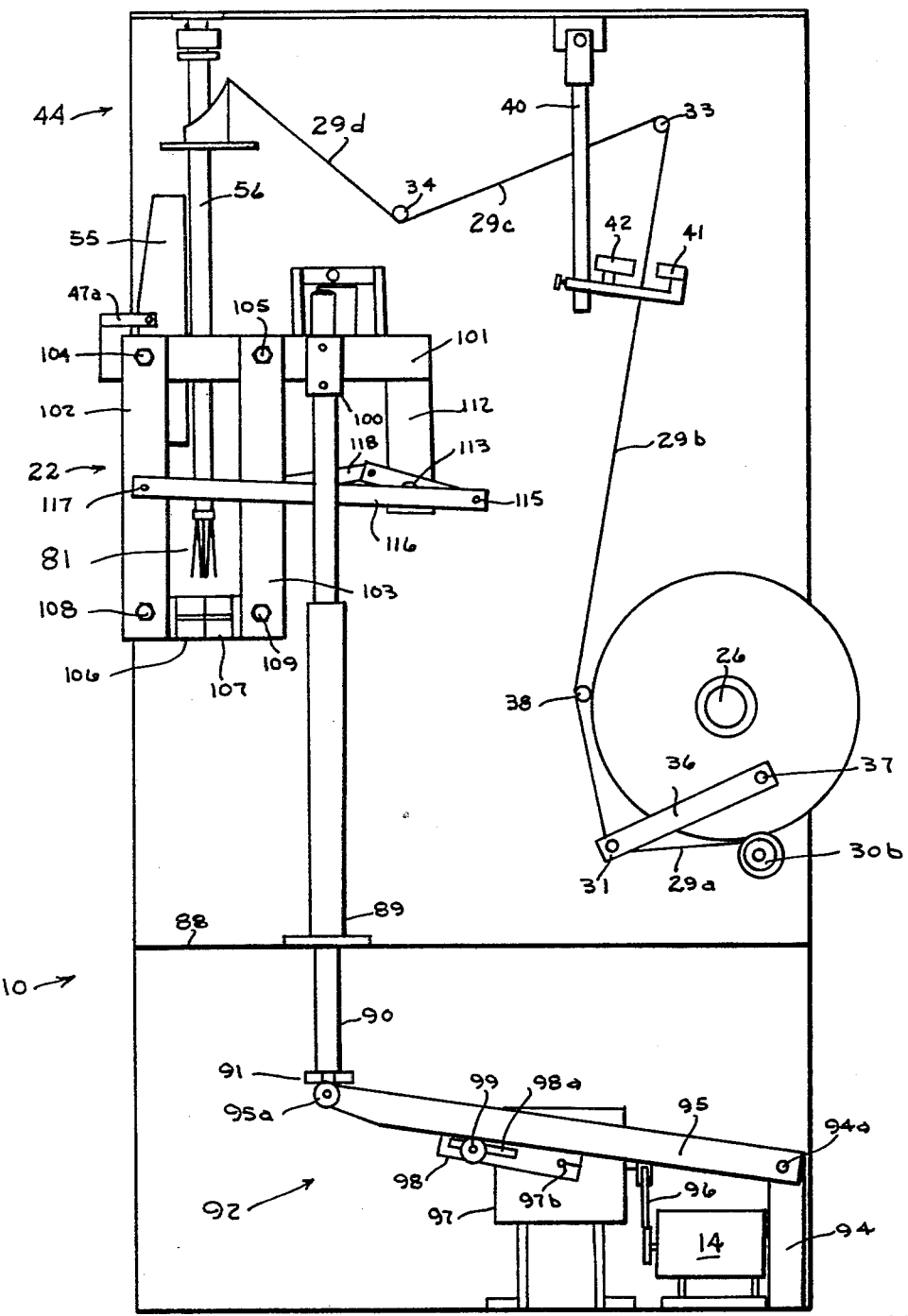
FIGURE 2 is a side view of the packaging machine of FIGURE 1 wherein the side wall structure has been deleted for clarity.

Attention is directed to FIGURE 2 which illustrates the spooled film material 29 mounted on the shaft 26. The cantilevered member 31 guides the film material at the segment 29a as it is stretched taut in leaving the spool 28 with predetermined tension to the roller means 31. Roller means 38 redirects the film whereby the segment 29b extends upwardly to an additional roller means 33. The roller means 33 redirects the film to another roller 34 and upwardly therefrom at the segment 29d to means for forming the film material into a vertically extending tubular roll as will be described. Along the route of the film material from the spool 29, it will be noted that a predetermined tension is maintained in the material since the roller member 31 is mounted on a movable arm 36 which is adapted to pivot about a point indicated at 37. The pivot point 37 is fixed with respect to the sides of the structure of the packaging apparatus; however, it will be appreciated that in FIGURE 2, the pivot member 36 is shown in proper perspective while omitting the sides of the structure. As viewed in FIGURE 2, clockwise rotation of the lever means 36 results from excessive tension in the film material 28 and in response thereto, the roller member 31 is lifted upwardly to initiate clockwise rotation to relieve the tension. On the other hand, weight of the roller member 31 moves same in a counterclockwise direction as viewed in FIGURE 2 whereby the path to be traveled by the film is therefore lengthened which tends to remove slack from the film and maintain the tension at a predetermined level. The tension acts along the full length of the film since the rollers 33, 34, and 38 are free to rotate. Additional details will be noted.

The rotatable hubs 27 and 28 are secured in the apparatus by obtaining an equilibrium of balance between the points of contact of the rotatable shaft 30 and the shaft 38 at the left-hand edge of the hubs in FIGURE 2.

A downwardly extending strut 40 is FIGURE 2 is a support means for photoelectric detecting means. A pair of spaced members on opposite sides of the film 29 includes a light source 41 and a photocell 42. The devices 41 and 42 are aligned near the edge of the film material to locate registration marks in the material to control the length of the packages made by the packaging apparatus 10. By way of illustration, opaque marks may be used on the clean film selvage with a predetermined spacing whereby the movement of the transparent film material between the photocell detector and light source interrupts the light to modulate the output of the phoocell 42. This signal is utilized in a manner to be described to control the length of packages formed by the present apparatus. Of course, opaque film is available and a reflector operated detection unit should be used to sense film movement.

The film material 29 is carried towards the top and front portions of the packaging apparatus 10 as shown in the upper left-hand corner of FIGURE 2. There, the means 44 forms the planar material into a tubular roll. The means 44 includes a transversely extending support plate 44a best shown in FIGURE 1. The support 44a carries a metallic, tubular collar 44b provided with an elliptical upper lip or edge indicated at 44c. The lip 44c is smooth to gently contour the planar film into the tubular shape. The tubular roll is centered with respect to the apparatus by the location of the upper lip 44c and the centerline of the film is directed at the centerline of the forming means 44. The edges of the film material are warped about the base of the lip 44c to overlap at the centerline of the former as viewed in FIGURE 1 whereby the tubular roll is formed extending downwardly from the forming means with the two edges overlapping at the seams, as yet unsealed at the forward portion of the packaging apparatus 10.

The filling apparatus extends axially through the former means 44b from the mounting bracket 45 shown in FIGURE 1. Additional brackets are indicated at 46 and 47 for suspending the former tube 44b at the proper location with respect to the packaging apparatus. Again, it will be noted that the centerline of the film material is aligned with the centerline of the former 44b and the associated film column extending therethrough as previously described.

The film material moves downwardly from the former means 44 toward the vertical seam forming means 21. A horizontal support bar 47 extends across the packaging apparatus 10 and includes a pivot member or a hinge indicated at 48. A fixed bracket attached to the side of the apparatus 10 supports the pivot member 48 so that one end of the support bar 47 is pivotally mounted at a fixed location. The horizontal support bar 47 has a free end at the right-hand side of the apparatus when viewed in FIGURE 1 which is connected to hydraulic actuating apparatus indicated generally at 49. Referring to FIGURE 1a, hydraulic actuating apparatus includes a mounting bracket indicated at 50 secured to a hydraulic cylinder 51 and to the side wall of the packaging apparatus 10. The hydraulic apparatus includes an extendable piston rod which is connected by means of a pin 52 and appropriate locknuts to support bar 47. The hydraulic cylinder 51 extends forwardly on actuation to pivot the support bar 47 about the pivot point 48. It will be appreciated that such movement is effective at all points along the length of the support bar 47 so that the midpoint also effects some movement forwardly of the apparatus for a purpose to be noted hereinbelow.

The support bar carries a mounting bracket 47a shown in FIGURE 2 having a pivotal connection for a heater shown at 55. The vertically extending heater shoe 55 is provided with electrical power (the wiring has been omitted for clarity) to sufficiently heat the tubular roll of film material at the overlapped edges and form a leakproof seal. Specifically, the filler tube means 23 includes the vertically extending tube 56 (see FIGURE 2) internally of the tubular roll and opposite the heater shoe 55 which is externally located. The face of the shoe 55 is arcuately shaped to conform with and properly seat against the filler tube 56 whereby the co-fitting surfaces clamp the edges of the film material together prior to heating. Of course, a surge of electrical power through Nichrome or tungsten wire heats the film. It has been found preferable to place a strip of Teflon over the heating element itself to prevent scorching the film material.

In all events, the heat is applied to the vertical seam to form a leakproof seal. Moreover, the length or span of the shoe 55 (FIGURE 2) is such that it overlaps each heated seal along the length of the tubular roll to prevent gaps in the roll when the film material is pulled downwardly by the packaging apparatus 10. Also, it will be noted that the shoe is clamped against the conduit 56 of the filler means 23 only when the film is not moving. The mounting bracket 47 is also pivotally connected with the shoe 55 to accommodate slight variations in vertical alignment relative to the conduit 56.

From the foregoing, it will be appreciated that the film formed into the tubular member is sealed to provide a continuous vertical member below the vertical heating shoe 55. However, since the film is essentially free hanging, the tubular roll is not necessarily formed into the desired cylindrical or oval shape and, as a matter of fact, it may hang in any form or shape. For this purpose, a film spreader is provided and reference is made to FIGURE 6 for a sectional view illustrating the film spreader means 60. The spreader 60 includes a pair of laterally projecting fingers 61 and 62 for providing the proper width to the formed tubular roll. The film spreader is secured by a mounting collar 63 positioned about the filler conduit 56. FIGURE 5 illustrates the upper corners of the spreader means 60 smoothed to a rounded radius at 61a and 62a. The collar 63 is also provided with additional spreader means at 64 and 65 to the spreaders 61 and 62. However, the spreaders 64 and 65 are provided to maintain only a slight clearance between the film and the external surface of the conduit 56. The film is shown in FIGURE 6 at the line 28f to indicate the approximate contour achieved in the package. Since the film is free to yield, depending on how the package is filled, the shape is not rigid and is maintained only for alignment with the present invention. A set screw 66 joins the collar and the associated spreader means 60 to the filling conduit 56.

Attention is next directed to FIGURE 4 which illustrates the liquid handling apparatus. In FIGURE 4, a reservoir 70 maintains a large supply of liquid to be packaged. The present invention is intended to be used with liquids of all natures, including food products, industrial chemicals, chemicals for home consumption and other items. At the lower end of the reservoir 70 is attached a pump 71 connected to an upwardly extending conduit 72. The conduit provides liquid to a container 73 located above the packaging apparatus 10, it being appreciated that the major portions of the structure of the packaging apparatus have been omitted from FIGURE 4 for purposes of clarity. The container 73 is a relatively small receptacle for liquid compared with tank 70. The liquid in the container 73 maintains a constant head at the connection of conduit 74 returning excess liquid to the larger container 70 for recycling. The regulated head of liquid aids in control of the rate of delivery of liquid as will be described.

A mounting bracket 75 positions hydraulically-operated means 76 above the filler tube 56 and the small container 73. The cylinder 76 actuates a push rod 77 which extends through an opening in the support bracket and through the bottom of the container 73 and into the liquid filling conduit 56. The hydraulic cylinder 76 is preferably double acting with an upper chamber 80 filled with a compressible gas. An adjustable needle valve is provided at 81 in tube 80.

The push rod 77 extends the length of filler tubes 56 to a valve 81 which will be described in greater detail in FIGURE 5. The valve 81 controls fluid flow through a nozzle 82 always located in the tubular roll of film near the lower transverse seam. It will be appreciated that the transverse seam is a bottom, as it were, of the tubular roll so that liquid supplied from the nozzle 82 is received within the tubular roll and a measured quantity is dispensed with each package cut from the tubular roll. The valve means 81 will be described in greater detail in reconsidering FIGURE 5.

In operation, pressurized fluid is provided through an air line 78 to the hydraulic cylinder 76. The piston is lifted and the push rod 77 opens the valve means 81 to flow liquid into the container. The piston in the cylinder 76 forces compressible fluid through the orifice in the tube 79. The closed chamber 80 provides a compression means for returning the piston in the cylinder 76 to its original position after a predetermined interval of time. The orifice 81 is adjustable to provide some degree of regulation of the volume of liquid delivered during each operation of the apparatus. Moreover, the damping of the hydraulic cylinder 76 in returning to its original position is such as to properly tail off the surge of liquid flowing through the valve means 81 as will be described. This assists in sealing operations of each liquid containing package.

A greater understanding of the valve 81 will be obtained from considering FIGURE 5 which includes a sectional view of the valve means 81. The push rod 77 is connected to a plug 84 which is lifted from a valve seat 85 formed interiorly of the nozzle 82. The plug 84 includes a cylindrical projection which extends interiorly of the bore 82a and the plug is appropriately sized to let a trickle of fluid through the bore 82a when disengaged from the seat 85. Thus, sealing is accomplished by the tapered shoulder 84a carried on the plug when contacted against the valve seat 85.

When the plug 84 is withdrawn some slight distance from the valve seat 85, the tubular projection extending into the bore 82a maintains a constriction therein whereby a surge of fluid is prevented and only a trickle passes through the annulus. The trickle of fluid is important to preventing sudsing, foaming, or other physical disturbances generally associated with a surge of fluid as the fluid is dumped into the package formed and positioned below the nozzle 82. Moreover, capillary effect maintains a thin film along the wall of the passage in the nozzle 82 whereby agitation and enveloping of air to form bubbles is prevented, and the net result is a smooth flow through the fluid distributing means which builds up rapidly, and yet, this without foaming.

The previously described apparatus of the packaging machine 10 forms the tubular roll of film material which extends downwardly about the liquid filling tube 55 as a continuous member. At this juncture, means have not been indicated for forming individual packages from the roll whereby the product is placed therein and it is severed from the tubular roll. The present invention incorporates the means 22 for forming individual packages on the tubular roll. For a description of the jaw means 22, attention is first directed to FIGURES 1 and 2 showing the jaw means 22 in proper perspective with the rest of the apparatus. In FIGURE 1, a dividing wall 88 extends across the packaging 10 and supports a pair of upstanding tubular guide members 89. The tubular guide members are joined to the support 88 by means of a welded flange. A push rod 90 is extended through each of the tubular guides 89. The push rods 90 are joined to a horizontally extending bar 91 which engages means best described as a walk beam means 92.

The side view of FIGURE 2 illustrates the walking beam means 92 as connected with a fixed member 94 at the rear of the packaging machine 10 which is joined to the frame. A pivot 94a engages a walking beam 95. The walking beam 95 positions a roller 95a on an appropriate fulcrum to engage the nether side of the support bar 91. The movement of the beam 95 is transferred through the roller 95a to the horizontal support bar 91 to oscillate the push rods 90 upwardly and downwardly.

Movement is provided from the power source 14 previously noted. Appropriate power takeoff means are provided in the form of a V-belt drive 96 to a gear box 97. The gear box 97 has an output shaft extending at right angles of the V-belt input to the gear box and an appropriate gear ratio provides about thirty cycles per minute, each cycle being the number of operations of the packaging machine.

In FIGURE 1, it will be noted that the gear box includes the shaft 97a which extends exteriorly of the packaging apparatus 10, and the opposite end of the same shaft as indicated at 97b. The shaft 97b is joined by an appropriate set screw and collar to a rotatable lever arm 98 (FIGURE 2). The arm 98 includes a slot 98a in which is located the mounting shaft of a bearing wheel 99. The wheel 99 can be located anywhere along of the slot 98a to vary the effective radius of rotation of the wheel 99 about the shaft 97b. Alteration of the radius of rotation of the roller 99 also varies the range of movements of the beam 95 about its pivot point 94. The net result is that the vertical movement of the push rods 90 in the guides 89 is varied to control the length of containers formed by the packaging apparatus 10.

Attention is directed to FIGURE 1 which illustrates the push rods 90 which carry the jaw means 22 upwardly and downwardly to form each individual container. In FIGURE 1, the vertical push rods 90 are secured to collars 100 by set screws with the collars 100 screwed to opposite sides of the jaw means 22. The vetrical position along the push rods 90 of the collars 100 determines the limits of movement of the jaw means 22. The collars 100 are joined to horizontally extending members (only one of which is shown) indicated by the numeral 101 which members are prependicular to the plane of the illustration of FIGURE 1. FIGURE 2 illustrates the collar 100 secured to the side support frame member 101 of the jaw means 22, it being noted that due to the symmetrical construction of the jaw means 22, certain of the duplicated parts are not shown. Also, FIGURE 2 illustrates the entirety of the jaw means 22 carried on the push rods 90.

The jaw means incorporates a number of spanning braces such as the brace 102 shown in FIGURE 1 to support the parallel side members 101. The side members 101 supports downwardly extending jaw pieces 102 and 103 which are secured to the horizontal members, preferably by individual bolts, lock washers, and nuts 104 and 105. The jaw pieces 102 and 103 pivot about the points 104 and 105, respectively, to move jaw members 106 and 107 towards one another. The jaw members 106 and 107 are likewise pivotally connected by indicated bolt assemblies 108 and 109 shown in FIGURE 2. As will be described in greater detail, heater means in one of the jaw pieces incorporating a Nichrome wire in the upper and lower portions extending approximately the full width of the jaw member 106 melt the polyethylene film comprising the packages made by the present invention. The Nichrome wire is preferably covered with a strip of "Teflon" to prevent scorching or burning of the film. Moreover, a knife is located between the two Nichrome wires to cut the completed and sealed package from the film material between the two seams formed transversely of the film whereby the package dropped from the jaws on opening is completely sealed as an integral structure having the liquid product therein as will be described.

A consideration should be extended to the movement of the jaw members 106 and 107 toward one another as shown in FIGURES 2 and 7. At the rear portions of the horizontally extending members 101 are provided downwardly extending support braces 112. The braces 112 support an axis for a shaft 113 which is illustrated in FIGURE 2. The shaft or axle 113 has a fixedly attached connective link 114 which is so arranged (FIGURE 2) to include a greater length extending rearwardly and with a shorter arm extending slightly forwardly. The rearward portion of the lever 114 is connected by a pivot at 115 to a rather long extending linkage member 116 which is connected to the jaw piece 102 by a pivot at 117. In like manner, the forward portion of lever 114 is connected by a linkage member 118 which extends to the jaw piece 103. The lever 114 is rotatable with the shaft 113 whereby each end of the lever cooperates with the connecting linkage members 116 and 118 to open and close the jaw members 106 and 107. Specifically, rotation in the clockwise direction of the lever 114 rotates the pivot 115 toward the jaw piece 102 such that the jaw member 106 is moved forwardly of the packaging apparatus 10 or rotates clockwise about the pivot point 104. On the other hand, the linkage member 118 causes rotation of the jaw piece 103 about the pivot point 105. Clearly, the rotation of each of these members in opposite directions opens the jaw means 22.

Attention is redirected to FIGURE 1 which provides the front view of jaw means 22. In FIGURE 1, the rotatable shaft 113 is shown extending fully across with the jaw means 22. Means are provided for rotation of the shaft 113 which includes a somewhat forwardly projecting fixed eccentric arm 120. The eccentric arm is joined by means of a clevis 121 to a piston rod 122 (also, see FIGURE 7) extending from a cylinder 123 supported by an appropriate mounting bracket 124 in a spaced relationship to the shaft 113. The mounting bracket 124 is secured to appropriate cross-spanning support members in the jaw means extending to the horizontal members 101.

Aatention is redirected to FIGURE 7 for emphasis of the various pivot points such as the points 104 and 105. These pivot points are preferably in the form of shafts of substantial diameter etxending through relatively thick members with bearings countersunk into the members as desired to permit smooth rotation about the pivot points. Moreover, the shafts include hexagonal heads and are secured by nuts and appropriate lock washers or the like for continued and repeated use without shifting the arc of rotation of the various members. Moreover, the movement of the various linkage members in their planes of rotation to avoid interference with one another is obtained by placing the linkage member 116 exterior of, or outside of, the rotatable lever 114 secured to the shaft 113 while the linkage member 118 is secured inboard of lever member 114. That is to say, the linkage member 118 is on the inside of the lever 114 while the linkage member 116 is on the outside of the lever 114. In further particular, the linkage member 116 passes to the outside of the piece 103 and extending therepast to connect with the jaw piece 102. On the other hand, the shortness of the member 118 is such that it does not have to extend past other piece members, but rather, connects with the jaw piece 103 at a pivotal connection similar to that shown at 117 in FIGURE 7.

Additional facts should be noted about the jaw means 22 shown in FIGURE 7. The utilization of duplicate levers at opposite ends of the shaft 113 to move the jaw pieces toward one another places even pressure across the width of the jaw members 106 and 107. Of course, it is undesirable to have one end of the jaw members contact with greater force than the opposite end. The evenness of pressure along the length of the jaw members is desirable in forming a reliable seal in thepolyethylene film. To accommodate slight variations in the apparatus, including accumulation of tolerances and allowances, it is preferable to make the jaw pieces 102 adjustable in relationship to the linkage members 116. One means involves the use of an oversized opening 117a in which is placed on eccentric journal member 117b. The journal member 117b is rather snugly fitted within the opening 117a to fix the location of the opening in the journal. When the jaw piece 102 is not parallel to the opposite jaw piece, the journal member 117 is rotated within the opening 117a to realign the jaw members 106 and 107 for perfectly parallel movement and even pressure on the faces. In like manner, adjustments in the connection between the jaw pieces 103 and the linkage member 118 can also be provided if desired.

Other details of FIGURE 7 should be noted concerning the jaw means 22, such as the inclusion of a connective flange 123a for securing the hydraulic cylinder 123 to the supporting structure 124. The cylinder 123 is preferably double-acting with air pressure provided by lines 123b and 123c. It will be appreciated that all connections of the hydraulic lines are not fully shown due to the conventional nature of the hydraulic apparatus; however, the lines are flexible since the jaws means 22 is reciprocated in the packaging apparatus 10. The lever or eccentric 120 is joined to the shaft 113 by means of a clamp or collar 120a.

The jaw means are closed by upward movement of the piston shown in dotted line in FIGURE 7. Upward movement of the piston rod 122 rotates the crank throw or arm 120 in a clockwise direction about the shaft 113 to move the clevis downwardly. This moves the jaw pieces 102 and 103 from the closed position shown in FIGURE 7 to the open position whereby film is free to extend through the jaw members 106 and 107. The open position of the jaw members is associated with upward movement of the jaw means 22 to engage additional rolled film after the vertical seal forming means 21 has joined the overlapped edges.

The open position of the jaws is further associated with the lack of requirements of torque acting on the shaft 113 and the ease of rapid movement from the extreme open position to the closed position. It will be noted that the linkage arrangement provided in the jaw means 22 of the present invention provides high speed, low torque movement. That is to say, operation of the hydraulic apparatus to the above noted wide open position is associated with rotation of the arm 120 of perhaps sixty to eighty degrees rotation relative to the shaft 113. This tends to snap open the two jaw pieces through operation of the linkage members 116 and 118.

On the other hand, closure of the jaws and application of adequate force on the jaw pieces 106 and 107 to provide sufficient pressure in heat sealing the layers of film to form a leak-proof transverse seam is associated with high torque and slight rotational movement. High torque with incremental rotation is provided by the linkage means in the present invention. Attention is directed to the view of FIGURE 7 and the fact that added counterclockwise rotation of the eccentric 120 places maximum torque on the shaft 113 and the torque is communicated by a minimal "lever arm" from the shaft 113 to the linkage means 116 and 118 whereby maximum forces are exerted in the levers 116 and 118. Thusly, the maximum force is achieved at the faces of the jaw members 106 and 107.

In further consideration of the operation of the jaw means, it should be noted that the jaw means cooperate with the vertical seam forming means to provide the three seams which define a completed package. The vertical seam, of course, converts the planar film material to the tubular roll. The jaw means 22 forms two transverse seams on each operation. That is, on closure, a seam is formed at 107a and at 107b with a knife means interposed between for severing the completed package from the film material. However, the jaws form the parallel transverse seams on separate packages whereby the upper heater 107a actually forms the lower seam on each package, and the lower heater 107b forms the upper seam finally closing each package.

The knife means 130 is illustrated in FIGURE 8. The slots in the jaw pieces are indicated at 106a and 107d. The knife means is mounted in one of the slots and the opposing slot receives the knife on actuation. With this in view, attention is directed to FIGURE 8 which illustrates the knife means 130 removed from the slots 106a and 107d.

The knife means 130 includes a support carrier 131 which is an L-shaped member providing backing and support to the knife blade 132. The knife blade is preferably a cutting device similar to a hacksaw blade having the illustrated outline. That is to say, the curved ends are preferably removed and appropriate mounting holes are drilled at locations indicated by FIGURE 8. The carrier 131 is provided with countersunk area 131a and 131b. Connective links 133 and 134 are joined to the carrier 131 by appropriate pin connectors. Likewise, the opposite ends of the links 133 and 134 are joined to the cutting device 132.

The cutting means 130 is placed in the slots 106a and 107d with the carrier member 131 in the slot and positioned essentially completely therein with the exception that the end portion 132a of the knife is located exteriorly of the jaws. Exposure of the end 132a of the knife enables connection of means for operating the knife means 130 to extend from the enclosure into the other slot. FIGURE 8 illustrates a hydraulic cylinder 136 including a piston rod 137 pivotly connected to the cutting blade 132 by a clevis 138. Actuation of the hydraulic cylinder to extend the piston rod 137 moves the cutting blade 132 away from the carrier 131, and when considered within the structure shown in FIGURE 7, into the opposing, vacant slot. The film material is clamped between the jaw members 106 and 107 on closure and the cutting device 132 cuts the film on actuation of the hydraulic apparatus 136. An individual package or container is severed from the film material between the two seams. Of course, retraction of the hydraulic apparatus withdraws the knife blade from the cutting position and returns the entirety of the cutting means 130 to recess fully within the slot. As will be appreciated, it matters not which of the two slots is used for the positioning of the cutting means of the present invention so long as the means does not interfere with the film material as it passes through the open jaws.

In FIGURE 8, the hydraulic cylinder is not connected to the jaw means. Of course, the jaw means 22 provides a side-connected carrier on the jaw members to support the hydraulic cylinder and associated apparatus. Likewise, a flexible line is provided for communicating compressed air to the apparatus so that the jaw means 22 is permitted to reciprocate without interfering with the cutting function.

The packaging apparatus 10 of the present inventio has been considered to the extent necessary to trace the sequence of handling the film from the bulk position best shown in FIGURE 2 whereby the film is drawn linearly upwardly into the packaging apparatus and is formed into a tubular roll and is thereafter shaped into individual packages. Generally, the mechanical apparatus shown in FIGURES 1 and 2 has been considered; however, attention is next directed to FIGURE 3 which details the film spooling means 18. Attention is first directed to the hub means 27 shown at the lefthand side of the spool of film material. Interiorly of the hub means 27 is located a centering piece 27a, fixed to hub 27 by means of a screw 27b. The centering member 27a incorporates a peripheral shoulder 27c abutted against the roll of film material when placed on the hub means. Set screws are provided at 27d for joining the hub means 27 and centering member to the shaft 26.

The hub means 28 includes a centering member 28a which is likewise attached to its hub by means of an assembly screw 28b. The centering member 28a has a tapered periphery 28c. The taper 28c is driven against the spool of film with a wedging action which tends to urge the film material against the shoulder 27c on the opposite hub. This provides registry of the film material with respect to the hub means 27, as will be appreciated. The wedging force is achieved by tightening the locknut 26a on rotation of the lever 26b to urge the hub 28 axially along the shaft 26.

Total alignment of the spool of film is obtained on setting the hub means 27 on the shaft 30 which supports and rotates the spool of film. The shaft 30 incorporates a connective fitting 30d having a threaded opening at the lefthand end. A threaded shaft 30e is rotated by a lever 30f protruding from a collar 30g on the shaft 30e exposed for ease of operation. The coupling 30d incorporates an integral bearing 30h which receives the journal centered at the lefthand end of the shaft 30 proper. The coupling 30d is locked in position by the locknut abutting the shaft 30e. A pillow block 30i is screwed to the side wall of the packaging apparatus.

The two rollers 30a and 30b are joined to the shaft 30 by set screws.

The support roller 30 feeds into a coupling 30j which is joined to the shaft 30 by a key 30k. A drive shaft 30L is connected into the coupling 30j for rotating the roller 30. Greater details will be related concerning the motive means for the roller 30 hereinafter.

Attention is next directed to the means 31 which were previously noted providing a way of maintaining controllable tension in the film as it leaves the spool 29. Attention is redirected to FIGURE 2 which illustrates the path of the film in the packaging apparatus 10. As previously noted, the roller 31 is pivotly connected at 37 at each end and secured relative to the side walls of the structure. Attention is directed to the righthand portions of FIGURE 3 wherein the sidewall includes a pillow block 140 supporting the pivot member 37. The pivot member includes a nut for locking the arm 36 to a shaft which is supported by the pillow block and extends therethrough to rotate a cam 141. The cam 141 engages the operative control of an air valve 142. An inlet air line 143 connects the valve 142 and an air line 145 directs fluid to an air motor drive and gear box 144, items which are well known in the art. The cam 141 is provided with a helical radius to open the valve 142 on rotation of the pivot 37 and in response to tension in the film 29.

An increase in the film 29 results in movement of the means 31 (as was discussed relative to FIGURE 2) and this movement is coupled to the air valve 142 to modulate air flow to speed up or slow down the air motor. The influx of greater air to the air drive motor speeds up its operation and rotates the roller means 30 at a greater rate. Increase in rotational speed of the means 30 is associated with faster pay out of film to ease the tension as the film acts against the member 31. A commensurate lessening of tension in the film permits the member 31 to relocate itself and thereby alter air flow through the air valve 142. As previously noted, proper registry of the film with respect to the equipment is maintained by the shoulder 27c on the hub means 27 and the slot in the roller enlargement 30b.

In operation, it should be noted that the film spool means 18 of the presnt invention provides film to the packaging apparatus 10 without regard to variations in dameter of the roll of film 29. That is to say, as the roll diminishes in diameter as more and more film is used from the roll, it does not affect the operation of the present invention since the rate of providing film to the packaging apparatus is dependent only on tension and is not dependent on the diameter of the roll of material. The device effectively maintains tension within a predetermined range of tension in the film material to regulate the stretch and give of the film material. A substantial variation in film tension will yield irregularity in the completed packages. Moreover, it is possible to place so much tension in the film material that it is pulled through the jaw means and heating elements, resulting in an ineffective seam or cut in the film since the heat or knife would not be applied to the required area of film for an adequate interval of time. Moreover, it is possible to so fatigue the film material with excessive tension that the film cannot make a substantial package, possibly leaking or rupturing when filled with the product. As a net result, the apparatus provides quality control from package to package assembled by the apparatus of the present invention.

Figure 10:
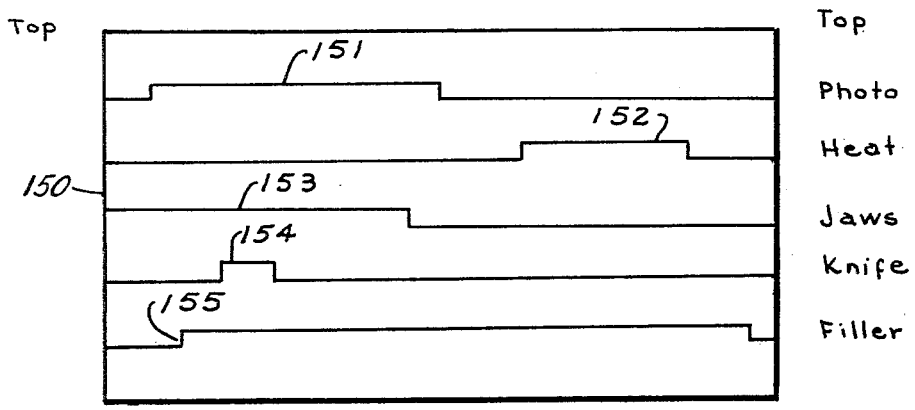
FIGURE 10 is a timing chart relating the sequence of events in operation of the present invention.

Attention is next directed to FIGURE 10 which is a timing chart diagram illustrating the sequence of operation of the apparatus. The timing chart includes an ordinant 150 which coincides timewise with the instantaneous position of the jaw means at the top of the stroke resulting from the upward movement of the push rods 90. The ordinate 150 is chosen as a reference point since the upper movement of the jaws is to engage and pull film downwardly to initiate forming the next package from the roll of film. Therefore, the timing chart starts with the jaw means 22 located at the top position (see FIGURE 1) and shows one cycle of operation when the jaw means returns to the top of the stroke.

Considering movements of the jaw means in a cycle of operation, the upstroke moves the jaws along the film material. The photo electric control means is energized for controlling the length of the film package. The light source 41 and photoelectric cell 42 sense passage of an opaque mark formed near the edge of the film material as the film passes between the light source and detector. Thus, timing chart wave form 151 indicates the "on" period of the photoelectric apparatus. An additional trace 152 in FIGURE 10 shows timing of the heater elements in the vertical shoe 55. The trace 152 indicates that electrical power is applied to the heater element forming the vertical seam in the tubular roll, it being recollected that the edges are overlapped and heated. Wave form 153 indicates closure of the jaws occurring at the topmost position.

The wave form 154 indicates operation of the knife means 130 for separating individual package units from the film material whereby each package is severed and dropped from the jaws on opening. Clearly, the knife means is restricted to operation while the jaws are closed or during the interval represented by wave form 153.

The wave form 155 indicates the filling operation. Reference is made to FIGURE 4 which illustrates means for providing time-metered flow of liquid products into the package. As noted before, the valve means 81 is open to flow liquid through the nozzle 82 into the package. Wave form 155 starts after closure of the jaw means clamping the tubular roll to provide a closed bottom whereby the liquid does not pour out of the open tubular roll. The presence or absence of a seal at this time is not important to avoiding of leakage of liquid products through the incomplete package, however, it will be noted that the heat is applied during the operation of the filling means to seal the package at its lower transverse seam. One significant point is that the filling operation stops (see the end of the wave form 155) just prior to movement of the jaw means 22 to the top of the stroke when the filler means is restarted only slightly after closing the jaw means, it being recalled that the previously completed package remains hanging below the jaws but is sealed against the further admission of liquid products.

Attention is next directed to FIGURE 9 of the drawings which is an electrical and hydraulic schematic of means for operating the apparatus 10. A source of electrical power is provided through a conventional electric plug 160 which communicates with a fuse 161. Connected to the fuse 161 is the light bulb 41 for providing light which passes through the film 29. The light source 41 is located adjacent the film 29 permitting the opaque mark to interrupt the light transmission to the photocell means 42. An adjustable series resistor 162 cooperates with the photocell to form a voltage divider. The voltage divider is connected across a silicon controlled rectifier 163 with the gate connected to the midpoint of the voltage divider. Electrical power is furnished through the armature 164 of a relay which communicates with some positive source and twelve volts is a suitable voltage.

In operation, the opaque mark decreases the light transmitted from the source 41 to the photocell 42. This results in an increase in resistance of the photocell which decreases the voltage at the midpoint of the voltage divider and connected to the gate of the SCR 163 to turn off the SCR 163. Interruption of current flow through the SCR operates the relay 164 and returns the relay contacts 164a to the indicated position. On the other hand, excessive light falling on the photodiode decreases its resistance to the extent that the gate voltage approaches the anode voltage and the current through the SCR 163 is turned on by the gate operation whereby the relay 164 is operated to provide connections which will be described.

Additional utilization of electrical power furnished by the power source is related to the connection and operation of an additional SCR 166. The SCR is communicated at its cathode with a voltage transformer 167 which provides an output voltage in a suitable range, such as forty-eight volts. The transformer 167 is connected with a pair of parallel heater elements represented schematically at 168 and 169.

Physically, the two heater elements located in the jaw means 22 are represented as resistor 169, whereas the vertical heater is indicated at 168. It will be further noted that a relay is provided which chooses between the two devices and the relay is indicated at 170. Relay 170 switches the electrical power from the vertical heater to the horizontal jaws or heating elements. An RC timer 171 is connected to the gate of the SCR 166 by a conductor 172 to turn the SCR "off" and "on" as desired. Current flow through the SCR is extinguished on the negative half-cycles of the AC power provided thereto from the conventional power source. The RC timer 171 has two inputs as will be described. One of the inputs is associated with the operation of the vertical seam forming means and this input is through the conductor 173. On the other hand, the conductor 174 inputs a signal which is associated with forming the transverse seams in the bags or containers. Additional details will be noted concerning operation of the RC timer 171 upon further description of the apparatus shown in FIGURE 9.

The apparatus of the present invention was previously described as including electric motor 14 which is shown symbolically in FIGURE 9 at the lower portions thereof. The electric motor 14 is connected with the gear box 97 (see FIGURE 2) and is provided with dual or identical output shafts 97a and 97b shown in FIGURE 1. The power required for movement of the jaw means 22 is derived from the output 97b. The shaft 97a (preferably common with the shaft 97b, is a means of timing coordination whereby a pair of bevel gears are provided at 176 in FIGURE 1 for communicating rotative motion to a shaft 177. The shaft 177 is secured in a pillow block 178 and the shaft 177 extends up the side of the packaging apparatus to the control box 12 near the upper portions of the packaging apparatus. The rotating shaft 177 drives a plurality of cam switches which are located in the control means 12, and which open and close in timed sequence illustrated in detail in FIGURE 10.

Referring again to FIGURE 9, the shaft 177 is indicated symbolically with a plurality of switches indicated generally at 180. The switches 180 are opened and closed in accordance with the intervals indicated on timing chart FIGURE 10. The first interest is the switch element 180a connected by the conductor 173 with the RC timer. The application of electrical power on closure of switch contacts 180a by the cam action noted above passes current through conductor 173 to initiate operation of the RC timer. The RC timer 171 provides an output signal in the conductor 172 which controls time duration of current flow through the SCR 166. The resistive element 168 was previously described as a Nichrome wire which radiates heat sufficient to form the vertical seam in the tube of film material and each operation thereof is associated with an individual package as the tube is drawn later on through the packaging apparatus. Scorching is prevented since the SCR is turned off by the timer 171 to limit the duration of heat. As an aside, it should be noted that the vertical shoe 55 is clamped against the vertically extending fill pipe 56 filled with liquid to maintain a relatively cool surface inside the film so that heat buildup in the seam forming means is limited.

Considering FIGURE 9, the shaft 177 operates the switch 180b. These contacts provide an electrical ground through the conductor 182 which communicates with a four-way spool valve 183. The spool valve 183 has solenoids at opposite ends to position the valve spool for various operative conditions as will be described. In further particular, initiation of operation of the jaw means 22 is by the signal from switch 180b. The disruption of the ground circuit through the conductor 182 interrupts the operation of the solenoid at one end of the valve 183. The spool is repositioned to operate the double-acting hydraulic cylinder 123 which closes the jaw means through the mechanical linkage described previously and illustrated in FIGURES 1, 2 and 7. As shown in FIGURE 9, the hydraulic apparatus 123 moves the arm 120 to rotate the fixed levers 114 coupling motion through the linkage means 116 and 118 to the jaws which are shown schematically in FIGURE 9. Closing the jaw means 22 carries the two jaw members 106 and 107 against one another as described with respect to FIGURE 7.

FIGURE 9 includes additional apparatus not shown previously in the form of a micro switch 185 which is contacted against a striker plate 186. The striker plate 186 closes the micro switch 185 to provide a signal in the conductor 174 which communicates with the timer 171. It will be appreciated that the closure of the jaws indicates the ready condition of the jaw means 22 for forming the horizontal or transverse seams in the bags or containers. The signal from the micro switch 185 is further communicated to the relay 170 which switches the transformer 167 to jaw heater Nichrome resistance wires 169. A slight time lag is built in the RC timer 171 by means of a series capacitor or the like which slightly delays startup of the timer 171 to permit the relay 170 to complete its closure whereby the relay contacts are permitted to settle and firmly contact one another prior to a surge of current for the heater elements, it being recognized that current flows associated with heater elements are large and tend to burn contacts when the contacts are switched during current flow. Moreover, the timer 171 again regulates the interval of operation of the SCR 166 and the heat applied to the jaw heaters 169.

Termination of the closure of the jaw means 22 is optionally associated with the operation of the photoelectric source 41 and photocell 42. As previously noted, the SCR 163 is appropriately switched to interrupt operation of the relay 164. The relay operates relay contacts 164b to the energized position whereby the solenoid 183a is reenergized by what is effectively the provision of a ground path through relay contacts 164b in parallel to the cam operated switch 180b. This returns the hydraulic cylinder 123 to its initial or quiescent condition whereby the jaw means 22 are opened. Of course, this opens the micro switch 185 and terminates electric current flow to both the timer 171 and the relay 170. Moreover, this is associated with the formation of a package of the desired length, it being realized that the closure of the jaw means occurs near the start of downward movement of the jaw means whereby the downward stroke and duration of jaw closure is related to the length of each package. On bags or containers not having critical length or in the absence of advertising on the film, it is not necessary to register the bag by the use of photo detection equipment.

It is not necessary that the photo detector means 42 be operated at all times and to this extent, a cam operated switch 180c deprives electrical power from the relay 164 and the associated circuitry. The wave form 151 shown in FIGURE 10 illustrates the interval during which current enables the circuitry connected to the contacts 180c FIGURE 10 includes the wave form 154 which indicates operation of the film cutting means 130 previously described. In FIGURE 9, the switch 180d initiates operation of the knife means 130 previously described. The switch 180d is connected to a solenoid valve 188. Valve 188 is provided with a solenoid at 188a and is a single-acting valve having a neutral position and an energized position achieved by movement of the valve spool on operation of the solenoid 188a. Hydraulic fluid flows through the valve and through conduit 136a operates the previously described hydraulic apparatus 136. Attention is particularly directed to the fact that the hydraulic apparatus 136 includes a return spring 136b on the down pressure side of the piston. The spring returns the piston to the withdrawn position of the knife means 130.

An additional conductor 191 is shown in FIGURE 9 which communicates with a switch 192 which is the main power switch of the apparatus. Closure of the switch 192 provides electric current through a conductor 194 to operate the motor 14. Electric power is bypassed around the switch 192 to the cam-actuated switch 180e. Switch 180e is communicated with the armature of relay 193 which operates the relay contacts 193a. One feature of the present invention is initiation of operation of the jaw means from the same beginning point in the cycle of operation each time the packaging apparatus 10 is turned on. The relay 193, in cooperation with the cam-actuated switch means 183e, provides means whereby the jaw means 22 are stopped at the same point in the cycle of operation. As previously noted, closure of the switch 192 provides electrical power through the conductor 194 to the motor 14. However, an alternate route is provided through the conductor 195 and the relay contacts 193a. When the switch 192 is closed, current flows to the motor 14 without regard to the position of the contacts 193a. However, when the switch is opened, all current flow must be through the conductor 195 and the connected contacts 193a. The contacts 193a are maintained in the illustrated, closed position when the relay 193 is energized, which is dependent on continued closure of the cam actuated switch 180e. However, rotation of the shaft 177 eventually opens the switch 180e to interrupt current flow to the relay, and when the relay is opened, current flow to the motor 14 is ended. This stops rotation of the motor 14 and the associated shaft 177 whereby the cam opening 180e is maintained open to hold the switch 180e open for an indeterminate period of time. This is the terminal condition in which the apparatus is maintained and it will be appreciated that it is a fixed point in the cycle previously shown in FIGURE 10. The preferable point in closure of the cycle is at the initiation of the cycle with the jaw means 22 at the uppermost position. The operation of the motor from the same "start" position is beneficial in that the liquid delivery is not initiated through the liquid delivery means prior to closure of the jaws therebelow. Moreover, starting from the same position yields uniformity in the packages formed by the present invention. Other benefits will be appreciated as flowing from the starting and stopping of the apparatus at the same position every time.

Additional items remain shown in FIGURE 9 yet to be described. The vertical seam-forming shoe is slaved off the hydraulic cylinder 123 associated with the jaw means 22. Recalling hydraulic cylinder 51 shown in FIGURE 1A, FIGURE 9 illustrates the cylinder 51 with its feed line 51a slaved off the hydraulic line communicated to the cylinder 123. Hydraulic cylinder 51 incorporates a single-acting arrangement with a return spring 51a located on the downpressure side of the piston for returning the piston to the original position. Moreover, the horizontal support bar 47 is illustrated in FIGURE 9 as being connected to the hydraulic cylinder 51.

It is believed that operation of the present invention will be understood from the foregoing descriptions directed to each of the individual drawings, and it is not necessary to further relate each of the individual components of the present invention to the circuitry shown in FIGURE 9 for an overall view of operations. With this in view, several factors should be noted concerning the present invention. The preferred embodiment has been described in the foregoing; alterations in structure may be incorporated therewith dependent upon the desires of the equipment. More specifically, the device of the present invention can be used to form packages including double layers of film. For instance, the provision of two film spooling means 18 on the back side of the packaging apparatus 10 to provide two planer films extending to the former means 44 in the upper portions of the apparatus will accommodate a double-wrap about a package of liquid products. Moreover, the device of the present invention can be made duplex in operation. That is to say, the jaws can be widened to possibly twice the indicated width and again, side-by-side spooling means 18 can provide film extending along two pathways and associated therewith the two former means to vertical seam forming means located above the one jaw means. Clearly, this will provide a means whereby multiple packages can be formed with each operation of the jaw means. Further alterations can be incorporated with the present invention, such as the utilization of a powder dispensing device as opposed to the liquid dispensing structure shown with the preferred embodiment.

The foregoing is descriptive of the preferred embodiment of the present invention; however, the scope of the invention is to be interpreted by the attached claims hereto.

What is claimed is:

1. A feed mechanism for supplying sheet film from a spool of film material, comprising:
   (a) first hub means adapted to be releasably connected to a spool of film material and incorporating a registration means for positioning the spool of film material at a predetermined lateral position relative to said hub means;
   (b) second hub means adapted to be releasably connected to the spool of film material, said second hub means and said first hub means cooperating to support and rotate said spool of film material;
   (c) at least one of said hub means having a peripheral driving means which is engageable to rotate said hub means and the spool of film material therewith;
   (d) a rotary drive mechanism engaged with said peripheral driving means for rotating said hub means and the spool of film material therewith to feed film material from the spool;
   (e) tension sensing means engaged with the film material;
   (f) means operable by the tension sensed by said tension sensing means for operating said rotary drive mechanism to supply film material and thereby alter the tension in the film material; and,
   (g) means for registering said first hub means with respect to said rotary drive mechanism to supply film material at a predetermined position with respect to the feed mechanism of the present invention.

2. The invention of claim 1, wherein said first and second hub means are assembled with the spool of film material as a unit, and including a support roller means and a drive roller means comprising a portion of said rotary drive mechanism, and wherein the unit including the spool of film material is engaged with said support and drive roller means, and said first hub means is registered with respect to said rotary drive mechanism by said registration means.

3. The invention of claim 1 wherein said first hub means includes an abutting shoulder and protruding tapered shaft adapted to be inserted into the end of the spool of film material to abut against said shoulder to register the spool of film material.

4. The invention of claim 3 further including a shoulder means on said rotary drive mechanism for abutting said first hub means to position the film material from the spool at a fixed position while the film material is removed from the spool.

References Cited
UNITED STATES PATENTS

| | | | |
|---|---|---|---|
| 2,164,599 | 7/1939 | Tyler | 242—75.53 |
| 2,343,181 | 2/1944 | Heinz | 242—75.53 |
| 2,679,987 | 6/1954 | Saliba | 242—66 |
| 2,718,738 | 9/1955 | Mast et al. | 53—64 |
| 3,084,491 | 4/1963 | Solomon | 53—389 |

THERON E. CONDON, Primary Examiner

R. L. SPRUILL, Assistant Examiner

U.S. Cl. X.R.

53—64, 180, 373, 389; 242—68.7